United States Patent [19]

Kellar et al.

[11] Patent Number: 5,212,544
[45] Date of Patent: May 18, 1993

[54] METHOD AND APPARATUS FOR MANIPULATING VIDEO IMAGE SIGNALS

[75] Inventors: Paul R. N. Kellar, Newbury, England; Neil R. Hinson; Alan L. Stapleton, both of Berkshire, United Kingdom

[73] Assignee: Quantel Limited, Newbury, Great Britain

[21] Appl. No.: 466,410

[22] PCT Filed: Jun. 22, 1989

[86] PCT No.: PCT/GB89/00701
§ 371 Date: Apr. 30, 1990
§ 102(e) Date: Apr. 30, 1990

[87] PCT Pub. No.: WO89/12943
PCT Pub. Date: Dec. 28, 1989

[30] Foreign Application Priority Data

Jun. 25, 1988 [GB] United Kingdom ............. 8815182

[51] Int. Cl.$^5$ ............................................. H04N 9/74
[52] U.S. Cl. ............................................. 358/22; 340/747
[58] Field of Search ................. 358/18, 22, 31, 160, 358/181, 80, 28, 75; 340/706, 747

[56] References Cited

U.S. PATENT DOCUMENTS

| 4,357,624 | 11/1982 | Greenberg | 358/22 |
| 4,488,180 | 12/1984 | Rabinowitz | 358/22 X |
| 4,639,765 | 1/1987 | D'Hont | 358/22 X |
| 4,667,222 | 5/1987 | McCoy | 358/22 |
| 4,707,731 | 11/1987 | Ghazey | 358/22 |

FOREIGN PATENT DOCUMENTS

| 2393497 | 12/1978 | France | 358/22 |
| 2172466 | 9/1986 | United Kingdom | 358/22 |

Primary Examiner—Alvin E. Oberley
Assistant Examiner—Kara Farnandez
Attorney, Agent, or Firm—Cooper & Dunham

[57] ABSTRACT

A system for manipulating video image signals, in which digitized composite video signals (i.e. D2 digitally encoded PAL or NTSC) are converted to component video signals (i.e. luminance and color difference signals) allowing selected pixels to be modified. In addition, the unconverted composite video signals are also stored and a key signal is generated which indicates which of the converted (i.e. component) pixels have been modified. An output signal is then produced by combining the manipulated signals and the unmanipulated signals in proportions determined by said key signal.

16 Claims, 1 Drawing Sheet

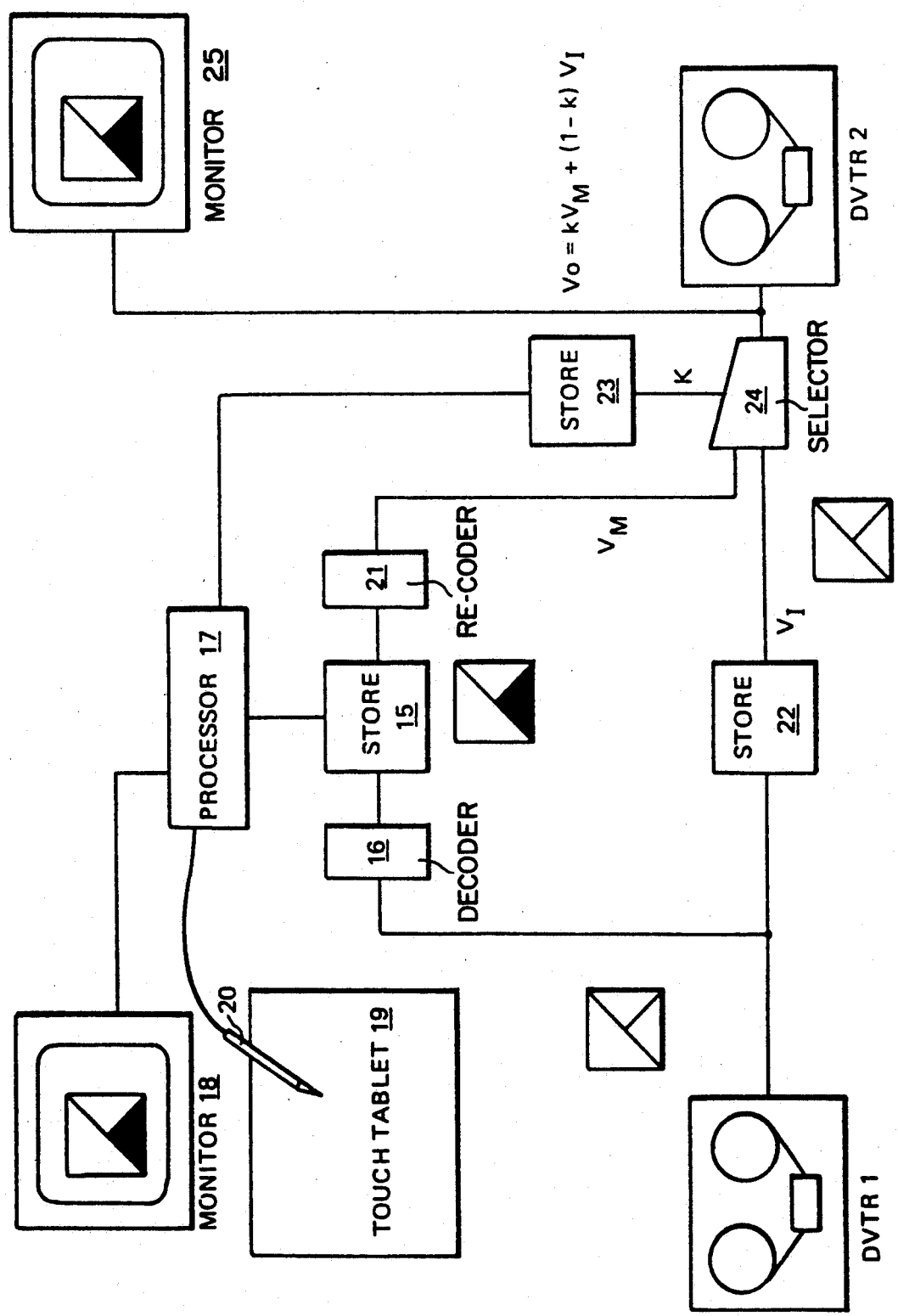

METHOD AND APPARATUS FOR MANIPULATING VIDEO IMAGE SIGNALS

BACKGROUND OF THE INVENTION

The present invention relates to manipulating video signals in the form of a composite encoded signals, such as digitized PAL or NTSC etc encoded according to the D2 standard.

A video graphics system is disclosed in U.S. Pat. No. 4514818, assigned to the present Assignee and included herein as part of the present disclosure, in which a video image is viewed on a monitor by generating an analogue video signal from digitally stored image data. The image data may be modified by the operation of a stylus upon a touch tablet, in which movement of the stylus simulates the operation of a graphic implement such as a paintbrush, chalk or an airbrush. A machine embodying the techniques disclosed in the aforesaid patent is manufactured by the present Assignee and sold under the trade mark "PAINTBOX".

Video graphics systems are often used during the post production stages of video making, in which a clip of video is manipulated by the system (frame by frame) so that elements may be added or removed from a live action shot, or animated sequences generated. The original recordings are often in the form of composite signals, such as PAL or NTSC, which are termed composites because they may be transmitted over a single channel, the chrominance signal (hue and saturation) being frequency multiplexed above the luminance signal. However, to allow manipulation by a video graphics system, the frames must be decoded into separate components, with a baseband signal for each of the three primary colours of red, green and blue, or for each of a luminance and two colour difference signals. If so required, the component signals may be re-coded back into composite form after manipulation.

A problem which results from decoding between composite video (say PAL) and component video is that clips which undergo this process do not match perfectly with unprocessed clips. A possible solution would be to perform the decoding and re-encoding process on all of the video clips as part of the editing process, however, this is not only time consuming but also unnecessary degradation to the whole of the production.

SUMMARY OF THE INVENTION

It is an object of the present invention to provide an improved method and apparatus for manipulating video image signals. In particular it is an object of the invention to allow a decoded composite signal to be manipulated, re-coded and then edited with non-decoded clips while minimizing differences between the two clips.

According to the present invention there is provided a method of manipulating video image signals, comprising the steps of decoding input composite video signals to give input component signals, storing digitized pixels of said decoded component signals, modifying selected pixels of said stored signals and coding said stored component pixels to produce manipulated composite video signals; characterized by storing said input composite video signals, storing an indication of said modified pixels of said stored component signals, and producing output composite video signals by selecting from said manipulated and re-coded composite video signals or from said stored input composite video signals substantially in response to said stored indication of the modified pixels.

BRIEF DESCRIPTION OF THE DRAWING

The sole FIGURE illustrates, in block diagram form, a system embodying an example of the invention.

DESCRIPTION OF THE PREFERRED EMBODIMENT

A system for manipulating video image signals is shown in the accompanying FIGURE, in which individual frames are played from a first digital video tape recorder DVTR1 and recorded on a second similar recorder DVTR2. The recorders sample a conventional composite video signal without demodulating it; in NTSC machines the sampling rate is 14.4 MHz conforming to a recording standard identified as D2. The recorders may form part of a conventional edit suite, in which they would be connected together; a solid line representing such a connection is not shown in the FIGURE.

The system is provided with video graphics apparatus, similar to that manufactured by the present Assignee and sold under the trademark "PAINTBOX". Individual frames are supplied to a component framestore 15, arranged to store a luminance value (Y) and two colour difference signals (U and V) via a decoder 16, which decodes the NTSC or PAL composite signals. The YUV signal conforms to the standard identified as 4:2:2 and is read at video rate under the control of a processor 17, allowing the stored frame to be viewed on a monitor 18 The video graphics apparatus also includes a touch tablet 19 and a stylus 20 so that, in response to operations made by a video artist with the stylus 20 upon the tablet 19, selected pixels stored in the framestore 15 are modified.

After each frame has been manipulated, the component signals may be re-encoded by a coder 21 to composite form and recorded on DVTR2. However, the coder 21 cannot perform an exact reciprocal process to that performed by the decoder 16, therefore, frames which have been decoded, stored in store 15 and re-coded to composite form will appear slightly different to those which have been transferred directly to DVTR2 under normal editing operations.

The system shown in the FIGURE, embodying the present invention, overcomes this problem by storing each frame of the image in two forms. Thus, in addition to the decoded version of a frame in component form, the original coded version of that same frame is also stored in composite form. After manipulation, areas of the image frame, stored in component form, will have been modified and these areas are selected and coded to provide an output. However, in areas which have not been modified, signals are obtained from the composite framestore ensuring that these areas match with similar areas in frames which have not been manipulated by the system.

The system is provided with a D2 framestore 22, an 8-bit key store 23 and a video selector 24. Each input frame which is converted to YUV for manipulation is also stored in its original coded form in the D2 framestore 22. The video selector is then arranged to select from either the manipulated signals, identified as $V_m$ or from the original video input signal, $V_i$, in response to a key signal k. The key signal is a multi-bit signal and, as such, may combine proportions of both the input signal and the manipulated signal. Thus, the output video signal $V_o$ is obtained by the equation shown in the FIGURE, i.e. the output is given by the product of k and the manipulated video signal $V_m$ plus the product of one minus k and the original input video signal $V_i$.

The values of k are stored on a pixel by pixel basis and generated in response to operations of the stylus 20. Thus, as YUV signals in store 15 are modified in response to signals from the stylus, key signals are simultaneously generated in the store 23. The generation of a key signal in this way is similar to the generation of a stencil signal, as described in U.S. Pat. No. 4602286 (equivalent to British Patent No. 2113950B) therefore, the key signal is eight bits deep and has soft edges. In some applications, the edges of the key may be too hard and the system may be provided with filtering means for softening edges defined by key signals. Alternatively, key signals may be produced from brush profiles simulating the operation of an air brush, even when other types of brushes are being used on the image.

The FIGURE illustrates an application of the system, in which the original input image consists of a square divided into three triangles. The D2 video input signals for the image frame are written directly to the D2 composite store 22 and are also written to the component store 15 via decoder 16. An image is now displayed on the monitor 18, by reading the stored component data at video rate and an artist "paints" the image, which, in this example, involves changing the colour of the lower triangle. In response to the operations of the stylus 20 on the touch tablet 19, an eight bit "shadow" of the modified triangle is also created in the key store 23 and, on completing the manipulation, the new image is recorded on DVTR2.

For pixels within the modified triangle, the image data read from store 15, and coded by coder 21, is supplied to DVTR2; these pixels having been modified by the artist. However, for pixels outside the shaded triangle, the coded output from coder 21 is ignored and the data is taken directly from store 22, so that these unmanipulated areas cannot be distinguished from images supplied directly from tape to tape. Along the edge of the modified triangle, the key signals have intermediate values, so that the signals supplied to DVTR2 consist of a blend of outputs from coder 21 and framestore 22, ensuring that no visible lines are seen at the transition between the sources.

A second monitor 25 is also shown in the figure, arranged to receive the composite output from combiner 24. This monitor shows the actual frame which will be recorded by DVTR2, therefore better results may be obtained if the artist uses this monitor instead of monitor 18.

We claim:

1. A method of effecting modifications to original digital composite video signals representing an original image in order to produce digital composite video signals representing a modified image, the method comprising:
   providing original composite video signals representing an original image;
   decoding the original composite video signals into corresponding component video signals and storing the component video signals in a first store;
   storing the original composite video signals in a second store;
   manipulating at least some of the component video signals in said first store;
   creating and storing in a key store, key signals related to manipulated component video signals;
   re-coding the component video signals from said first store into corresponding composite video signals;
   selecting, in response to said key signals form said key store, original composite signals form said second store or composite video signals resulting from said re-coding step; and
   forming a set of composite video signals representing a modified image from the video signals selected in said selecting step.

2. A method according to claim 1, wherein said manipulating and crating steps comprise manipulating component video signals and creating key signals by a processor responsive to an input device comprising a stylus interacting with a touch tablet.

3. A method according to claim 2, wherein said crating step comprises using the processor to create said key signals in response to the position of said stylus when interacting with said touch tablet.

4. A method according to claim 3, wherein said key signals comprise multi-bit key signals for respective component video signals, each multi-bit key signal defining a range of values between first and second extreme values, wherein:
   a key signal having the first extreme value indicates that the respective component video signal has no been modified and only an original composite video signal from said second store is to be selected in said selecting step;
   a key signal having the second extreme value indicates that the respective component video signal has bene extensively modified and only a corresponding composite video signal resulting from the re-coding step is to be selected in said selecting step; and
   a key signal having a value within said range indicates that both said corresponding composite video signal resulting or the re-coding step and a corresponding original composite video signal for said second store are to be selected in said selected step.

5. A method according to claim 4 wherein when a key signal has a value within said range, said forming step comprises combing an original composite video signal form said second store and a corresponding composite video signal from said re-coding step in a weighted combination determined by a respective key signal.

6. A method according to claim 4 comprising reading said component video signals form said first store to a monitor for display of an image represented thereby.

7. A method according to claim 2 comprising reading said component video signals from said first store to a monitor for display of an image represented thereby.

8. An apparatus for modifying original digital composite video signals representing an image in order to produce digital composite video signals representing a modified image, the apparatus comprising:
   a source of original composite video signals;
   a decoder coupled with the source and decoding original composite signals received therefrom into corresponding component video signals;
   a firs store coupled with the decoder and storing component video signals received therefrom;
   a second store coupled with the source and storing original composite video signals received therefrom;

a manipulating circuit coupled with the first store and manipulating component video signals stored therein;

a key signal creating circuit coupled with the manipulating circuit to receive information pertaining to component video signal manipulated thereby and creating key signals related to manipulated component video signals; 'a key store coupled with the key signal creating circuit and storing key signal received therefrom;

a coder coupled with the first store and re-coding component video signals stored therein into corresponding re-coded composite video signals; and a selecting circuit coupled with the key store, the coder and the second store and forming a set of composite video signals representing a modified image by selecting from among original composite video signals from the second store and re-coded composite signals from the coder depending on key signals form the key store.

9. An apparatus according to claim 8 wherein said manipulating circuit and said key signal creating circuit comprise a processor, a monitor coupled with said processor to display an image corresponding to the component video signals stored in said first store, and an input device comprising a stylus and touch tablet couples with the processor to supply thereto information related to the relative positions of the stylus and tablet.

10. An apparatus according to claim 9, wherein said key signal creating circuit comprises a circuit for generating said key signals in response to the position of the stylus relative to the tablet when interacting with the tablet and for writing the generated key signals to the key store.

11. An apparatus according to claim 8, further comprising a reading circuit coupled with said first store to read component video signals therefrom and a monitor coupled with said reading circuit to receive component video signals read thereby and to display an image corresponding to the received component video signals.

12. An apparatus according to claim 8, further comprising a monitor coupled with a selected one of the firs store and the selecting circuit to display an image corresponding to video signals received therefrom.

13. An apparatus according to claim 8, wherein said key signal creating circuit comprises a source of respective multi-bit key signals for component video signals in said first store, each multi-bit key signal defining a range of values between first and second extreme values, and wherein said selecting circuit comprises circuits responsive to: (i) a key signal which has said first extreme value, indicating that the respective component video signal has not been modified by the manipulating circuit, to select only a corresponding original composite video signal form said second store; (ii) a key signal having the second extreme value, indicating that the respective component video signal has been extensively modified by the manipulating circuit, to select only a corresponding re-coded composite video signal form said coder; and (iii) a key signal having a value within said range to select both said corresponding original composite video signal from said second store and said corresponding composite video signal form said coder.

14. An apparatus according to claim 13, wherein said selecting circuit comprises circuits for combining the corresponding composite video signal from the coder and the corresponding composite video signal form the second store in a weighted combination determined by the respective key signal when the key signal is in said range.

15. A method of modifying composite video signals comprising storing an original composite video signal unaltered and, in addition, decoding the original composite video signal into a component signal form and storing the resulting signal in component signal form, manipulating at least selected portions of the signal which is in component signal form, crating a corresponding control signal during said manipulation, and re-coding at least the manipulated portions of the signal which is in component signal form into a composite form and combine the re-coded signal which is in the composite form with said unaltered original composite signal under control of said control signal.

16. Apparatus for use in modifying composite video signals, comprising:

means for storing an original composite signal unaltered;

means for decoding said original composite signal into a signal which is in composite signal form;

means for storing said signal which is in component signal form;

means for manipulating selected portions of said signal which is in component signal form and for creating a corresponding control signal during said manipulating;

means for re-coding into composite form the manipulated portions of the signal which is in component signal form; and means controlled by said control signal for combining said manipulated portions re-coded into composite signal form with respect portions of said stored unaltered original composite signal.

* * * * *